M. LOPISICH.
AUTOMATIC FISH HOOK.
APPLICATION FILED AUG. 12, 1916.
1,238,159.
Patented Aug. 28, 1917.
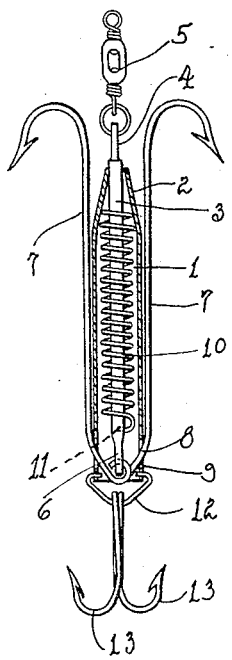
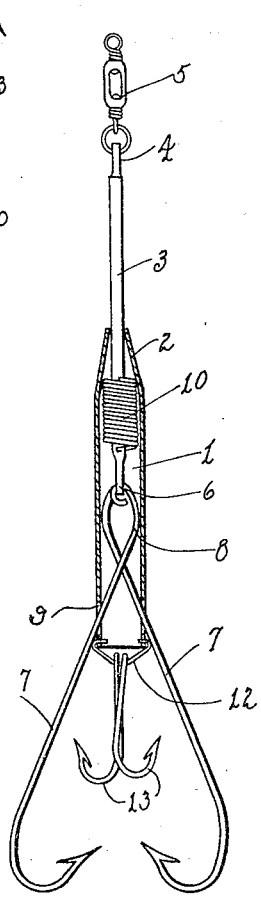
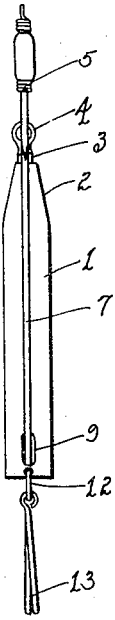
WITNESS
Floyd M. Blanchard
INVENTOR.
Mateo Lopisich
BY
ATTORNEY.

UNITED STATES PATENT OFFICE.

MATEO LOPISICH, OF SACRAMENTO, CALIFORNIA.

AUTOMATIC FISH-HOOK.

1,238,159.  Specification of Letters Patent.  Patented Aug. 28, 1917.

Application filed August 12, 1916. Serial No. 114,565.

*To all whom it may concern:*

Be it known that I, MATEO LOPISICH, a citizen of the United States, residing at Sacramento, in the county of Sacramento, State of California, have invented certain new and useful Improvements in Automatic Fish-Hooks; and I do declare the following to be a full, clear, and exact description of the same, reference being had to the accompanying drawings, and to the characters of reference marked thereon, which form a part of this application.

This invention relates to an improved form of fish hook which may be used to catch any and all kinds of fish and may have used in connection therewith any kind of bait such as meat, worms, live minnows, spoons, spinners or flies as may be desired. Very often the fish is lost because of the fact that it is not securely attached to the hook and to eliminate this possibility I have devised this form of fish hook.

This hook will always be ready for action when a fish is striking at the bait and will automatically return to its normal position if not brought into actual use.

A further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claims.

In the drawings similar characters of reference indicate corresponding parts in the several views.

Figure 1 is an end elevation of the complete device.

Fig. 2 is a side elevation partly broken out in section showing the hook in its normal position.

Fig. 3 is a side elevation partly broken out in section showing the hook in its operating position.

Referring now more particularly to the characters of reference on the drawings the numeral 1 indicates a round housing member tapered, as at 2. Inserted in the small opening formed at the top of the housing by the tapering portion thereof is a shaft 3 adapted to slide loosely through the top of the said tapered part of the housing.

The top end of this shaft 3 will have an eye 4 and a swivel of the ordinary kind as used upon minnows and spinners will be fastened thereto. In the lower end of the said shaft 3 is formed an eye, as at 6, having fish hooks 7 which may be of any desired shape or form hooked therein.

These hooks 7 will be bent, as at 8, so that they will project through a slot 9 cut in the housing 1 and stand upwardly in their normal position as shown in Fig. 2. This position will be maintained by means of a spring 10 which will lie loosely around the shaft 3 inside of the housing 1 and be fastened to such shaft 3, as at 11. The upper end of this spring 10 will bear against the tapered portion 2 of the housing 1. This spring will always be pressing downwardly so that the shaft will normally stay as shown in Fig. 2, thereby holding the hooks 7 in the upward position as shown.

Upon the lower end of the housing 1 is fastened a bail 12 which will be made of a light piece of spring wire so that it may readily be disengaged from the said housing member. In the drawing I have shown two small hooks hung thereon. I desire however to have it understood that any other form of hook, spinner, fly, artificial minnow or any known form of bait used for attracting fish may be fastened upon this bail.

In practice the fish line will be attached to the eye of the swivel 5 and the bait of any desired kind fastened upon the hook or hooks suspended from the bail 12.

When a fish strikes at such bait the fisherman will consequently jerk up on the fishline which will draw the shaft 3 upwardly thereby contracting the spring 10 and causing the hooks fastened upon such shaft 3 to pull upwardly through the slot 9 into the housing 1. This will move the hooks 7 downwardly so that they will assume the position shown in Fig. 3. As the head of the fish will be approximately opposite the bait the tangs of the hooks 7 will engage the fish somewhere about the gills and become fastened therein. The fish will now be engaged by the hooks 13, or at least by the hooks 7, so that it will have small chance of escaping.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A fish hook comprising a tube provided with openings at its lower end, a pin guided centrally into said tube, the tube being slidable on the pin, fish hooks linked to the end of the pin within the tube and extending through the openings, a spring within the tube normally acting between one end of the pin and the opposite end of the tube to hold the tube over the length of the pin and the hooks spaced apart, a pull on the tube acting to slide same down on the pin against the pressure of the spring and move the hooks together.

2. A fish hook comprising a tube provided with openings at its lower end, a pin guided centrally into said tube, the tube being slidable on the pin, fish hooks linked to the end of the pin within the tube and extending through the openings, a spring within the tube normally acting between one end of the pin and the opposite end of the tube to hold the tube over the length of the pin and the hooks spaced apart, a pull on the tube acting to slide same down on the pin against the pressure of the spring and move the hooks together, and means on the end of the tube for fastening bait thereto.

3. The combination with a line, of a pin suspended thereon, a tube slidable longitudinally on the pin and normally held by spring pressure over the length of the pin, said tube being provided with openings at its lower end, hooks linked to the end of the pin within the tube and projecting through the openings, the sides of the openings acting as fulcrums for the hooks whereby when the tube is over the pin the hooks are held spaced apart and when the tube is pulled down on the pin the hooks are forced together.

In testimony whereof I affix my signature.

MATEO LOPISICH.

Copies of this patent may be obtained for five cents each, by addressing the "Commissioner of Patents, Washington, D. C."